United States Patent Office 2,759,005
Patented Aug. 14, 1956

2,759,005
KETO ALIPHATIC ACIDS AND METHODS OF PREPARING THE SAME

Lee N. Starker, Somerville, and Donna B. Cosulich, Plainfield, N. J., assignors to American Cyanamid Company, New York, N. Y., a corporation of Maine No Drawing. Application August 14, 1953,
Serial No. 374,422

14 Claims. (Cl. 260—406)

This invention relates to new organic compounds. More particularly, it relates to substituted keto acids of the fatty acid series and methods of preparing the same.

A vitamin-like substance which occurs widely in nature has been described in recent chemical literature as protogen. The compound 6,8-dithiooctanoic acid having the formula:

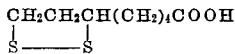

has protogen-like acitivity and has been found to be a growth supporting factor for certain microorganisms including S. faecalis, tetrahymena geleii, Corynebacterium bovis, butyribacterium rettgeri and Streptococcus cremoris. The splitting of the disulfide linkages in 6,8-dithiooctanoic acid has been described by others as vital to photosynthesis.

We have now found that certain new substituted keto acids are valuable intermediates in the preparation of active compounds such as 6,8-dithiooctanoic acid. These new substituted keto acids may be represented by the general formula:

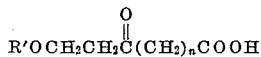

in which R' is a member of the group consisting of alkyl, monocyclic aryl and monocyclic alkaryl radicals and $n$ is a small whole number. Since these compounds contain a carboxylic acid group, they may also occur in the form of esters.

The compounds of the present invention are, in general, liquids at room temperature. They are immiscible with water and soluble or miscible with general organic solvents, such as acetone, ether, etc.

The compounds of the present invention can be prepared by several methods. However, we prefer to prepare them by the reaction of a vinyl ketone having the formula:

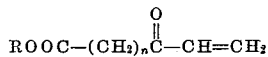

in which R is an ester group and $n$ is a small whole number with alcohols of the type R'OH in which R' is as previously defined. In carrying out this reaction it is desirable to have present a catalyst such as boron trifluoride etherate in the presence of mercuric oxide. The reaction is carried out by heating the vinyl ketone and alcohol in the presence of the catalyst to a temperature of from 50° to 120° for a period of from a few minutes to one hour. While it is not necessary, good results have been obtained by allowing the reaction mixture to stand at room temperature for a period of from several hours to several days, following which the mixture is neutralized with an alkaline substance. The excess alcohol or other solvent is then removed by distillation and the desired product purified by fractional distillation.

The compounds of the present invention can also be prepared by a method which utilizes a diester of an alkoxy methyl malonic acid. This intermediate is reacted with sodium to prepare the sodium salt, and through an ester interchange the sodium salt of the dibenzyl ester is obtained. This compound is then reacted with an acid chloride to lengthen the side chain in the manner desired following which the dibenzyl ester groups are removed by hydrogenation in the presence of a catalyst. The dicarboxylic acid radicals are then removed by heating to about 200° C. whereupon the desired compound is obtained. This reaction may be illustrated as follows using benzyl alcohol in the ester interchange to protect the carboxy groups:

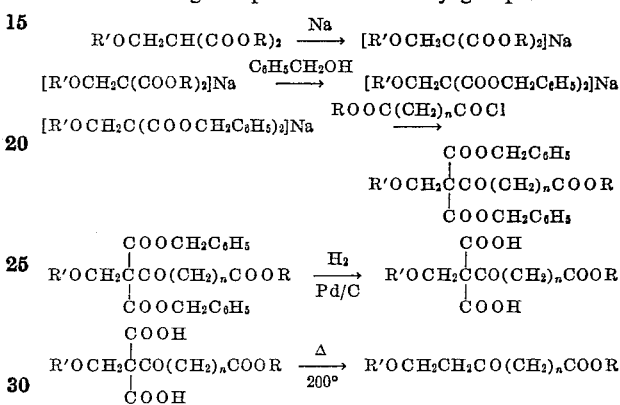

in which R is hydrogen or an ester group and R' and $n$ are as defined above.

The compounds of the present invention can also be prepared by reacting a vinyl dicarboxylic acid with an aldehyde. This reaction may be illustrated by the following equation:

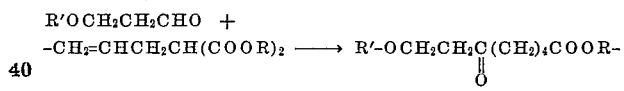

In the above equation R, and R' are as defined above. The above reaction takes place when catalyzed by free radical producing agents such as ultraviolet light or peroxides. Following the reaction in the presence of ultraviolet light or peroxides the compounds are then saponified and heated whereupon they give off carbon dioxide and through a process of hydrolysis and decarboxylation, yield the corresponding alkanoic acid.

The compounds of the present invention can be converted into 6,8-dithiooctanoic acid by reduction of the 6-keto group followed by treatment with a halogen acid, thiourea, etc. as shown in the examples hereinafter.

The following examples described the various methods of preparing substituted keto acids and the conversion of such acids into 6,8-dithiooctanoic acid.

Example 1

A catalyst mixture of 0.25 part of red mercuric oxide, 0.25 part by volume of boron trifluoride etherate and 2 parts by volume of methanol is heated, with shaking, for five minutes. The mixture is cooled and 10 parts by volume of benzyl alcohol is added. A solution of 24 parts of ethyl 6-keto-7-octenoate in 30 parts by volume of benzyl alcohol is next added and the mixture is heated on the steam bath for 3 hours. It is then left at room temperature for eleven days, after which it is neutralized with solid potassium carbonate, filtered and the excess benzyl alcohol removed by distillation. The residue is then fractionated and yields 2 parts of ethyl 6-keto-8-benzyloxyoctanoate, boiling point 146°–147° C./0.6 mm., $n_D^{25}$ 1.4940.

Example 2

A catalyst is prepared by heating and shaking a mixture of 0.25 part of red mercuric oxide, 0.25 part by volume of boron trifluoride etherate and 2 parts by volume of absolute methanol. The mixture is cooled to room temperature and 10 parts by volume of anhydrous n-butanol is added. This is followed by a solution of 25 parts of ethyl 6-keto-7-octenoate in 30 parts by volume of n-butanol. The mixture is heated on the steam bath for one hour and then left at room temperature for three and one-half days. The acidity is neutralized with excess anhydrous potassium carbonate. The solution is then filtered and the filtrate is distilled at reduced pressure to give 12.5 parts of ethyl 6-keto-8-butoxyoctanoate boiling at 129°–136° C./550 microns and 131°–134.5° C./250 microns. An analytical sample boiled at 135°–136° C./550 microns, $n_D^{31}$ 1.4390.

Example 3

A catalyst consisting of 0.2 part of red mercuric oxide, 0.2 ml. of boron trifluoride etherate and one ml. of methanol is prepared by heating the ingredients on the steam bath for several minutes. To this mixture is then added 20 parts of ethyl 6-keto-7-octenoate and 20 parts of freshly distilled phenol. The phenol dissolves and an exothermic reaction takes place. When the temperature begins to fall, the solution is heated on the steam bath for one hour and 20 minutes and left at room temperature for two days. The dark mixture is then cooled in an ice bath and about 100 ml. of ca. 2 N potassium hydroxide solution is added. The mixture is filtered and the filtrate is extracted with ether. The extract is washed with 2 N potassium hydroxide solution, then with water and is dried over sodium sulfate. Removal of the ether from the dried extract leaves 19.8 parts of a dark, viscous oil, which on distillation yields ethyl 8-phenoxy-6-ketooctanoate, boiling point 85°–106° C./9 mm., $n_D^{23}$ 1.5150.

Example 4

To 51 parts of beta-ethoxypropionaldehyde is added 0.5 part of benzoyl peroxide, and then 20 parts of diethyl allyl malonate is slowly added (about two hours) from a dropping funnel. During the addition the mixture is stirred and heated at 80°–85° C. After all of the ester has been added, stirring and heating is continued for a total of 26 hours, two more portions (0.5 part) of benzoyl peroxide being added at intervals. The solution is then cooled, taken up in ether, washed with water, 5% sodium bicarbonate solution and then water again and finally dried over sodium sulfate. The ether is removed by distillation and the oily residue is distilled through a Vigreux column to give eleven parts of ethyl 2-rabethoxy-6-keto-8-ethoxyoctanoate, boiling point 120°–124° C./14 mm. Redistillation gives a pure sample, boiling point 127°–132° C./13 mm., $n_D^{26}$ 1.4468.

Ethyl 2-carbethoxy-6-keto-8-ethoxyoctanoate is warmed with dilute alkali and solution accurs as saponification takes place. The solution is acidified with dilute acid, precipitating the free acid,

When this is heated over a free flame, carbon dioxide is evolved and 6-keto-8-ethoxyoctanoic acid is formed.

Example 5

To a slurry of 2.3 parts of sodium sand and 100 parts by volume of dry benzene is added slowly a solution of 20.4 parts of diethyl methoxymethylmalonate in 60 parts by volume of dry benzene. After allowing to stir overnight, the white sodium salt slurry is mixed by dropwise addition of 21.6 parts of benzyl alcohol. The mixture is distilled at atmospheric pressure through a helices-packed column. When the temperature reaches 78.8° C. at a reflux ratio of 20 to 1, the ester interchange is considered complete and the sodium salt of dibenzyl methoxymethylmalonate is obtained.

After cooling, the mixture is treated with a solution of 18.8 parts of ethyl adipoyl chloride in 50 ml. of dry benzene, added gradually. The mixture is heated at reflux for 30 minutes, cooled and poured into ice water containing a trace of sulfuric acid. The benzene layer is saved and the aqueous layer is extracted four times with 200 parts by volume portions of benzene. The benzene extracts are all combined and dried over anhydrous sodium sulfate. Removal of the benzene by vacuum distillation left a residue which is heated at 80° C. and 0.23 mm. for one and a half hours and weighs 41.9 parts. This residue is dissolved in 150 parts by volume of anhydrous alcohol and reduced over one part of 10% palladium on charcoal. Two additional one part quantities of the catalyst are added whenever hydrogen absorption becomes too slow. After removal of the catalyst by filtration the filtrate is refluxed and concentrated at atmospheric pressure and finally under reduced pressure. The residue weighs 26 parts. It is dissolved in ether and the ethereal solution is extracted three times with saturated aqueous sodium bicarbonate. The bicarbonate extracts are combined, acidified with dilute hydrochloric acid and extracted three times with ether. The ethereal solution is washed several times with water, dried over anhydrous sodium sulfate and evaporated to give a residue weighing 11.6 parts. It is heated to 200° C. and carbon dioxide is evolved. On distilling twice 2.2 parts of 6-keto-8-methoxyoctanoic acid, boiling at 125°–129.5° C. at 1.3 mm., is obtained; $n_D^{22.1}$ 1.4444. It gives a negative enol test with ferric chloride, a positive carbonyl test with 2,4-dinitrophenylhydrazine, and a positive carboxyl test with sodium bicarbonate solution.

Example 6

A solution of 19.4 parts of ethyl 6-keto-7-octenoate in 30 parts of dry methanol is added to a mixture of 0.2 part of red mercuric oxide, 0.2 part of boron trifluoride etherate and 10 parts of methanol. The mixture is heated for three hours and then left at room temperature for twenty hours after which it is neutralized with anhydrous potassium carbonate. The solids are removed by filtration after which distillation yields 17 parts of an oil, boiling point 140°–159° C./16–21 mm., $n_D^{24.5}$ 1.4392. Fractionation of this oil yields 8.7 parts of the product, ethyl 6-keto-8-methoxyoctanoate, boiling point 103°–108° C./2 mm., $n_D^{25}$ 1.4400.

Example 7

A solution of 38.5 parts of ethyl 6-keto-7-octenoate in 50 parts by volume of absolute methanol is placed in a flask and 70 parts by volume of absolute methanol is added. Several crystals of p-toluenesulfonic acid are added and the solution allowed to stand at room temperature for six days. The solution is then refluxed for 30 minutes, cooled and neutralized with a dilute solution of sodium methylate in methanol. Distillation through a Vigreux column yielded 14.7 parts of ethyl 6-keto-8-methoxyoctanoate, boiling at 146°–150° C./12 mm., $n_D^{26}$ 1.4408.

Example 8

A catalyst is prepared from 0.25 part of red mercuric oxide, 0.25 part by volume of boron trifluoride etherate and 2 parts by volume of absolute methanol. The mixture is heated for about five minutes, cooled and 10 parts by volume of absolute ethanol are added. A solution of 25 parts of ethyl 6-keto-7-octenoate in 30 parts by volume of absolute ethanol is then added to the catalyst mixture. A mildly exothermic reaction sets in, after which the mixture is refluxed for 90 minutes on the steam bath and then left at room temperature for about 40 hours. Stirring with excess anhydrous potassium carbonate for about three hours neutralizes the reaction mixture, after which it is filtered and fractionated under reduced pressure to yield 8.7 parts of ethyl 6-keto-8-ethoxyoctanoate, boiling at 108°–110° C./450 microns, $n_D^{26}$ 1.4370.

*Example 9*

To a solution of 5 parts of ethyl 6-keto-8-methoxyoctanoate in 25 parts of dry methanol is added 0.4 part of sodium borohydride in one portion. An exothermic reaction sets in and the temperature rises to about 50° C. When the temperature begins to fall, the mixture is refluxed on the steam bath for 30 minutes. Twenty parts of water are added, the mixture refluxed for thirty minutes, then left at room temperature overnight. The organic layer is drawn off and combined with three 10 ml. chloroform extractions of the aqueous layer. After washing with 2 N sulfuric acid, and then with water, the chloroform extract is dried over a mixture of sodium bicarbonate and sodium sulfate. Evaporation of the dried solution gives 5.1 parts of a light yellow liquid. On distillation 2.1 parts of liquid is obtained, boiling point 159°–160° C.

A mixture of five parts of ethyl 6-hydroxy-8-methoxyoctanoate, 8.7 parts of thiourea and 26 parts of hydriodic acid is heated for twenty-two and one-half hours, cooled, made alkaline with dilute sodium hydroxide and again heated for two hours. The solution is acidified with dilute hydrochloric acid and extracted with chloroform. The chloroform is removed to leave 2.2 parts of 6,8-dithioloctanoic acid.

A solution of 1.5 parts of potassium carbonate in 10 ml. of water is used to dissolve 2.2 parts of crude 6,8-dithioloctanoic acid. The solution is placed in a tall narrow cylinder, 3 drops of 1% ferric chloride solution added and an air stream is passed through the solution till the red color changes to yellow. It is then acidified with concentrated hydrochloric acid, extracted with chloroform and the extract dried over sodium sulfate. Concentration of the dried extract leaves 1.1 parts of a viscous yellow oil, 6,8-dithiooctanoic acid, which possesses protogen activity.

We claim:

1. Compounds of the group consisting of those having the general formula

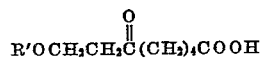

in which R' is a member of the group consisting of alkyl, monocyclic aryl and monocyclic alkaryl radicals and lower alkyl esters thereof.

2. A lower alkyl ester of a 6-keto-8-alkoxyoctanoic acid.
3. A lower alkyl ester of 6-keto-8-methoxyoctanoic acid.
4. Ethyl 6-keto-8-benzyloxyoctanoate.
5. Ethyl 6-keto-8-butoxyoctanoate.
6. 6-keto-8-ethoxyoctanoic acid.
7. Ethyl 6-keto-8-ethoxyoctanoate.
8. A process of preparing compounds having the general formula

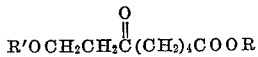

in which R' is a member of the group consisting of alkyl, monocyclic aryl and monocyclic alkaryl radicals and R is a lower alkyl radical which comprises heating a compound having the formula

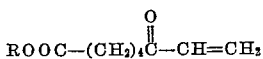

in which R is as defined above with a compound having the formula

in which R' is as previously defined in the presence of a catalyst.

9. A method of preparing a lower alkyl ester of a 6-keto-8-alkoxyoctanoic acid which comprises heating a lower alkyl ester of 6-keto-7-octenoic acid with an aliphatic alcohol in the presence of mercuric oxide and boron trifluoride etherate.

10. A method of preparing a lower alkyl ester of 6-keto-8-methoxyoctanoic acid which comprises heating a lower alkyl ester of 6-keto-7-octenoic acid with methyl alcohol in the presence of mercuric oxide and boron trifluoride etherate.

11. A method of preparing ethyl 6-keto-8-benzyloxyoctanoate which comprises heating ethyl 6-keto-7-octenoate with benzyl alcohol in the presence of mercuric oxide and boron trifluoride etherate.

12. A method of preparing ethyl 6-keto-8-butoxyoctanoate which comprises heating ethyl 6-keto-7-octenoate with normal butanol in the presence of mercuric oxide and boron trifluoride etherate.

13. A method of preparing 6-keto-8-ethoxyoctanoic acid which comprises heating ethyl 6-keto-7-octenoate with ethyl alcohol in the presence of mercuric oxide and boron trifluoride etherate, hydrolyzing and recovering said compound therefrom.

14. A method of preparing ethyl 6-keto-8-ethoxyoctanoate which comprises heating ethyl 6-keto-7-octenoate with ethyl alcohol in the presence of mercuric oxide and boron trifluoride etherate.

References Cited in the file of this patent

UNITED STATES PATENTS

| | | |
|---|---|---|
| 2,180,730 | Cox | Nov. 21, 1939 |
| 2,198,046 | Vierling | Apr. 23, 1940 |
| 2,348,231 | Strain et al. | May 9, 1944 |

FOREIGN PATENTS

| | | |
|---|---|---|
| 804,807 | Germany | Apr. 30, 1951 |